United States Patent
Haslem

[15] 3,701,445
[45] Oct. 31, 1972

[54] TILTING BED TRAILER
[72] Inventor: Alfred E. Haslem, 5363 Ranger Avenue, North Vancouver, B.C., Canada
[22] Filed: Sept. 13, 1971
[21] Appl. No.: 179,635

[52] U.S. Cl. ............214/506, 280/43.18, 280/43.19
[51] Int. Cl. ................................................B60p 3/10
[58] Field of Search....214/505, 506; 280/414 R, 414 A, 280/43.11, 43.18, 43.19

[56] References Cited
UNITED STATES PATENTS

| | | |
|---|---|---|
| 2,610,865 | 9/1952 | Cantrell..................280/43.18 |
| 2,740,543 | 4/1956 | Mounsdon et al.........214/506 |
| 2,807,381 | 9/1957 | Tegeler.......................214/506 |

Primary Examiner—Albert J. Makay
Attorney—Lyle G. Trorey

[57] ABSTRACT

A tilting bed trailer having a bed frame connectable at one end to a towing vehicle, and having supporting arms, ground wheels mounted on the supporting arms, the arms being connected for swinging movement at after ends to the frame so that when the arms are swung between horizontal and upwardly sloped positions the frame is moved between elevated and lowered positions.

6 Claims, 6 Drawing Figures

PATENTED OCT 31 1972
3,701,445
SHEET 1 OF 4
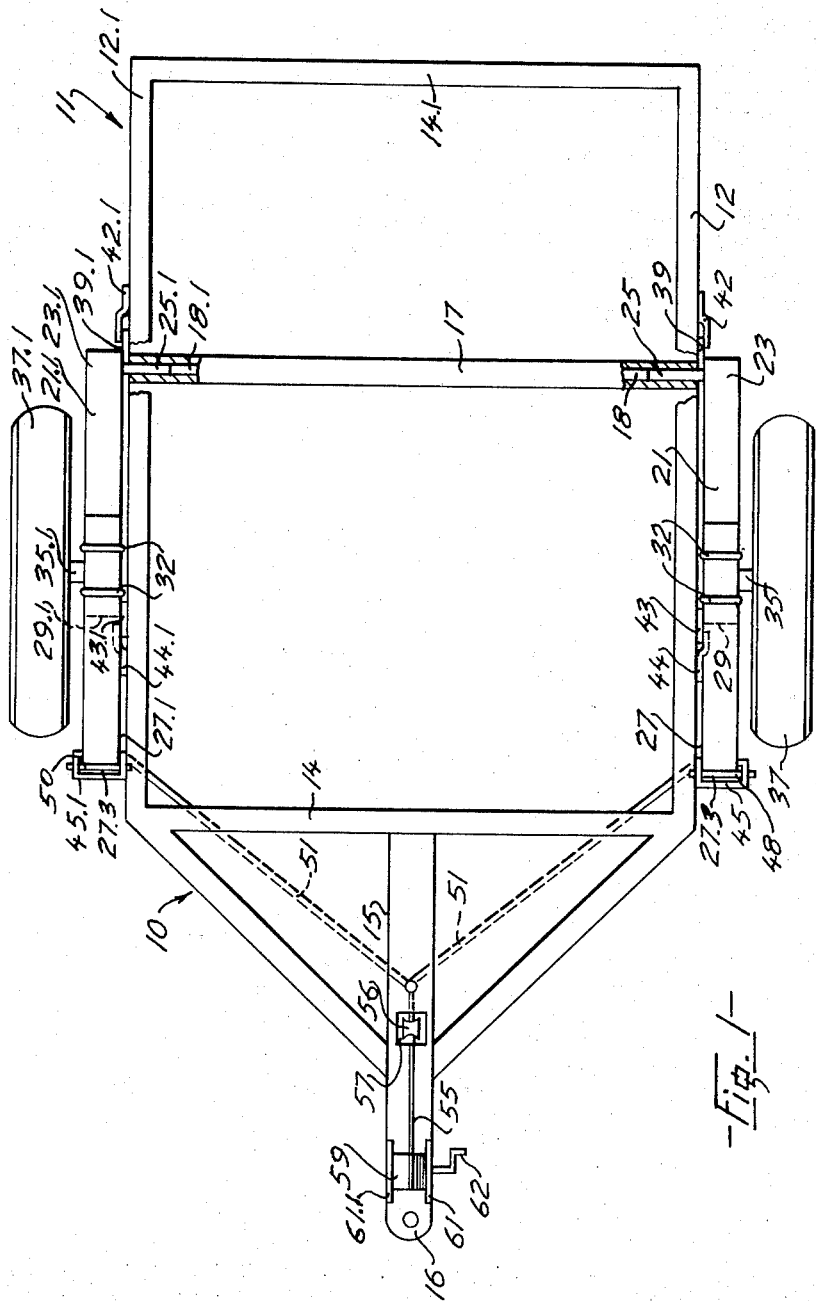
Fig. 1
Alfred E. Haslem,
Inventor
by 
Lyle G. Trorey,
Agent

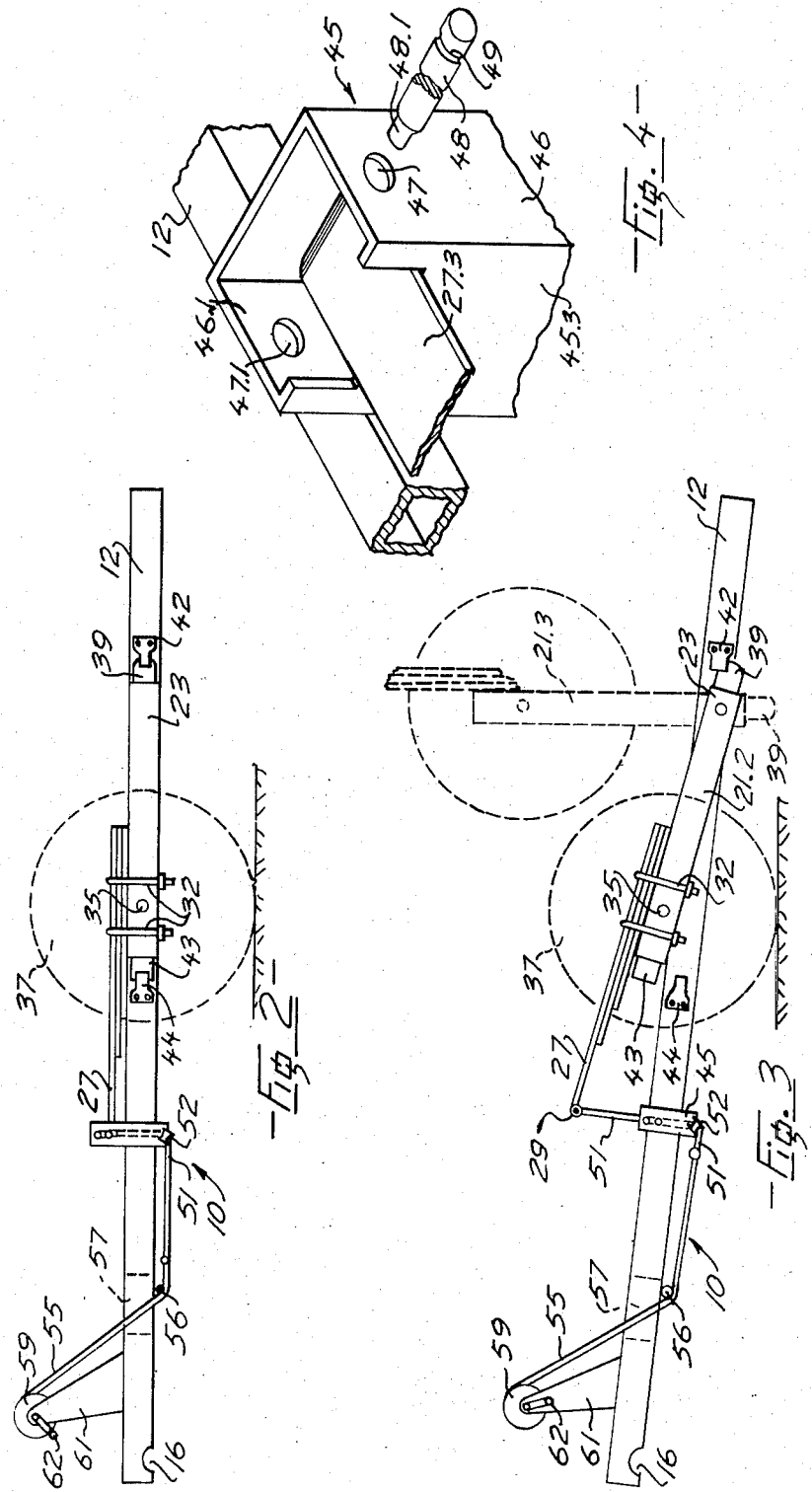

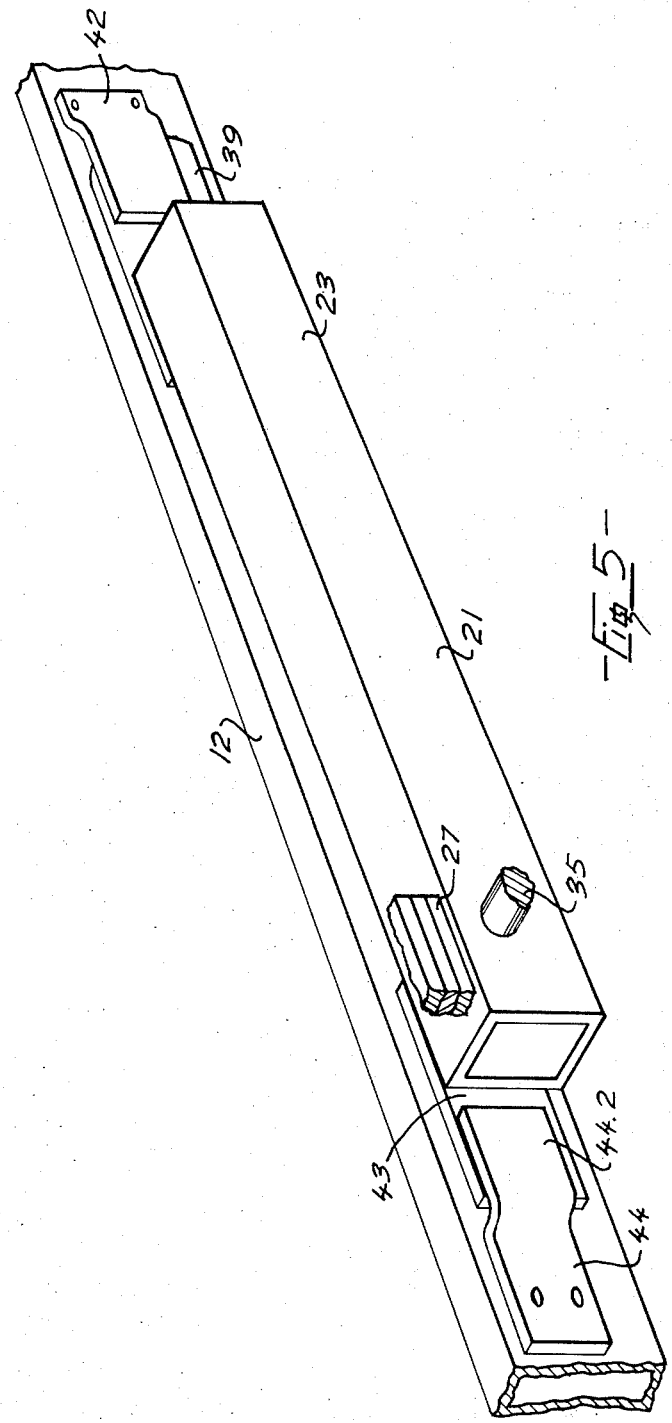

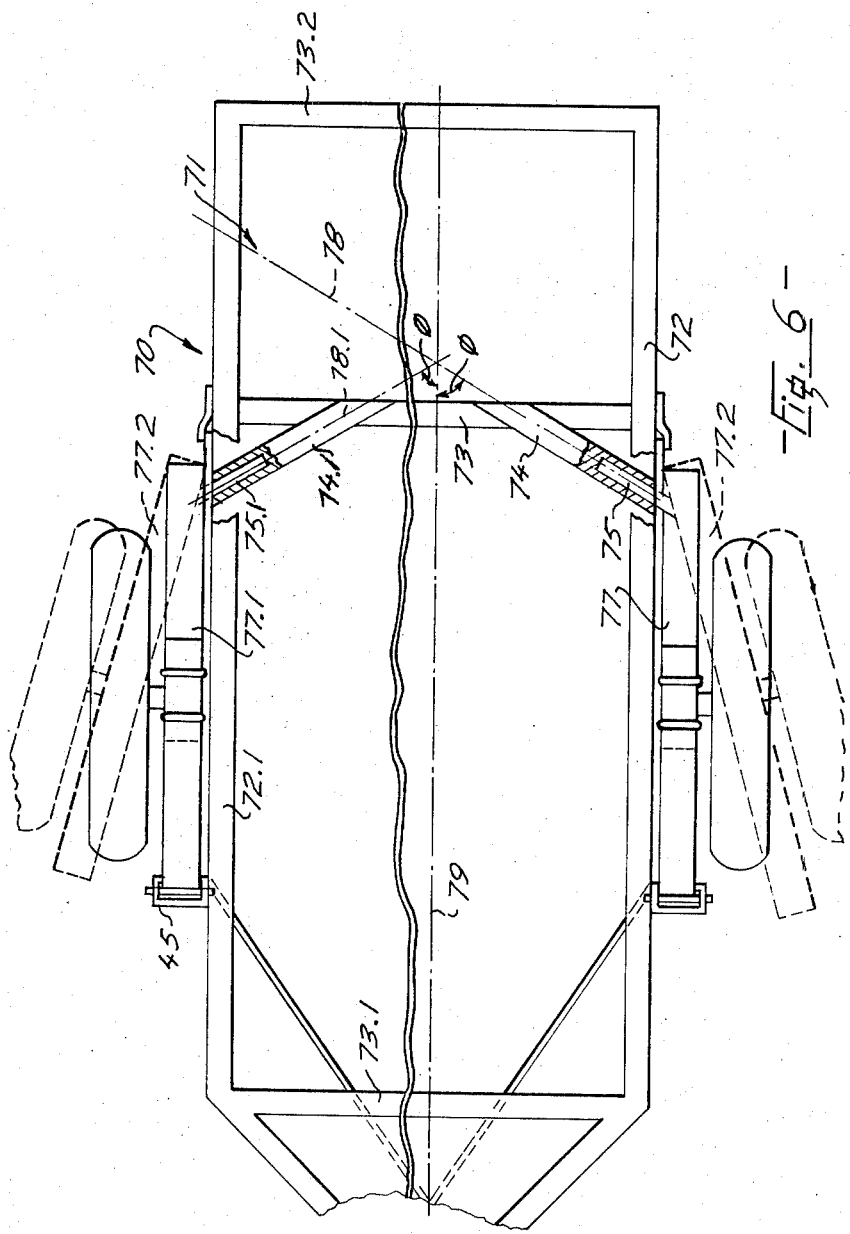

TILTING BED TRAILER

BACKGROUND OF THE INVENTION

1. Field of the Invention

The invention relates to a tilting bed trailer, namely to load carrying trailers which are connectable to towing vehicles such as automobiles, and which have beds which can be lowered and elevated to facilitate loading and unloading.

2. Prior Art

Most load carrying trailers which are towed behind a towing vehicle for carrying boats and small heavy pieces of equipment usually have a trailer bed mounted at a fixed height on supporting wheels so as to have sufficient clearance to negotiate rough ground over which the trailer is often hauled. Trailers of this type are difficult to load and unload.

In some trailers, commonly called tilting bed trailers, wheels are mounted for vertical movement relative to the trailer bed so that the trailer bed can be raised and lowered at will to facilitate loading and unloading.

Tilting bed trailers of prior art have not been so constructed so as to enable wheels and supporting structure to be easily and quickly secured to, or removed from, the trailer bed so as to facilitate stacking for transportation of the trailers, for instance from a manufacturing plant to a sales outlet, or for storage where space is at a premium.

SUMMARY OF THE INVENTION

The present invention provides a tilting bed trailer constructed so as to enable quick and easy disassociation of trailer wheels and supporting structure from the trailer bed so that the trailer can be disassembled for storage, and assembled for load carrying.

The trailer of the present invention is simple to operate, that is, to lower and elevate the trailer bed, and is relatively inexpensive to manufacture and maintain.

The trailer of the present invention has a pair of fore and aft extending wheel supporting arms on opposite sides of a trailer bed frame, the arms having stub shafts at aft ends, the stub shafts having a rotatable and slidable fit in sockets opening laterally of the trailer bed so that the arms can be swung between horizontal and upwardly sloped positions to lower or elevate the trailer bed. Flanges at the ends of the arms slidably fit between the trailer bed frame and flanges mounted on the frame so as to prevent withdrawal of the shafts from the sockets when the arms are swung between the horizontal and upwardly sloped positions. The flange arms are arranged to swing clear of the flanges on the frame when the arms are swung upwards past their upwardly sloped positions, so as to enable disassociation of the trailer bed frame and the wheels and the arms.

A detailed description following, related to drawings, gives exemplification of apparatus according to the invention which, however, is capable of expression in means other than those particularly described and illustrated.

DESCRIPTION OF THE DRAWINGS

FIG. 1 is a plan of a tilting bed trailer of the invention in a running position, FIG. 2 is an elevation of the trailer in a running position, FIG. 3 is an elevation of the trailer in loading position, FIGS. 4 and 5 are fragmented isometric views of portions of the trailer, FIG. 6 is a plan of a portion of an alternative embodiment of the trailer.

DETAILED DISCLOSURE

FIGS. 1, 2, 3, 4, and 5

FIGS. 1 through 5 show one embodiment, generally 10, of a trailer of the invention. Reference to FIG. 1, the trailer has a bed frame 11 having parallel longitudinally extending side frame members 12 and 12.1, and front and rear transverse frame members 14 and 14.1. Forward ends of the side frame members are bent to converge and are secured to a short central frame member 15 extending to and secured to the front transverse member 14. The frame member 15 has, at its forward end, a trailer hitch 16 by means of which the frame can be connected to an automotive vehicle, the hitch maintaining the forward end of the trailer at a predetermined height.

A tube 17, which extends transversely of the bed frame and which is secured to the side frame members opens outwards at opposite ends to provide sockets 18 and 18.1. A pair of supporting arms 21 and 21.1, see FIGS. 2, 3, and 5, are disposed on opposite sides of the trailer bed frame, aft ends 23 and 23.1 of the arms having projecting shafts 25 and 25.1 which have a slidable and rotatable fit in the sockets 18 and 18.1. Leaf springs 27 and 27.1 project forwards from forward ends 29 and 29.1 of the arms, the leaf springs being secured to the arms by U-bolts, severally 32.

Stub axles 35 and 35.1, FIGS. 1 and 5, project outwards from the forward ends of the arms and carry wheels 37 and 37.1.

As shown in FIGS. 2 and 3 rotatable connection of the arms 21 and 21.1 with the bed frame permits vertical movement of the wheels shown in broken outline, relative to the bed frame so that, with the arms 21 and 21.1 disposed horizontally, FIG. 2, the bed frame is in the horizontal running position clear of the ground, and with the arms sloped upwards, the bed frame is inclined to a loading position.

Flanges 39 and 39.1, see also FIG. 5, extend rearwards from the aft ends 23 and 23.1 of the arms and have a slidable fit between the side frame members 12 and 12.1, and flanges 42 and 42.1 mounted thereon so as to maintain the stub axles in their associated sockets. Flanges 43 and 43.1 are connected to, and extend forward of, the forward ends of the arms.

Flanges 44 and 44.1 are connected to the side frame members and have aft portions 44.2, FIG. 5, spaced from the side frame members to provide clearance to receive the flanges 43 and 43.1 when the arms are swung downward to horizontal positions to lock both the arms against lateral movement when the trailer is moved.

Brackets 45 and 45.1, see also FIG. 4, for receiving the forward ends 27.3 of the leaf springs are mounted on the side frame members. As seen in FIG. 4, in which one bracket 45 is shown, the bracket is box-sectioned having an aft wall 45.3 which is notched to receive a forward end of one spring when the arms are swung to horizontal positions. The bracket has upstanding side walls 46 and 46.1 having registering holes 47 and 47.1 for receiving a pin 48, the holes being located so that the pin extends over and across the forward end of the spring so as releasably to lock the springs and the arms in their horizontal positions. The pin has an annular groove 49 in which an edge of the side wall 46 at the hole 47 is adapted to fit so as to prevent withdrawal of the pin when under load. The pin has end portion 48.1 of reduced diameter which fits in the hole 47.1. The bracket 45.1 is the same as the bracket 45 and has a pin 50 which is the same as the pin 48.

A first cable 51, see FIGS. 1, 2, and 3, extends beneath the bed frame and around pulleys 52 mounted at lower ends of the brackets 45 and 45.1 and is connected at opposite ends to the forward ends of the leaf springs. The cable 51, FIG. 1, is connected to a second cable 55 which passes over a pulley 56, and thence upwards through an opening 57 in the central frame member 15 and is wound on a winding drum 59. The drum is mounted for rotation between a pair of upstanding supports 61 and 61.1 connected to the central frame member 15 and is manually operated by a handle 62.

The trailer bed frame can be provided with known rollers (not shown) to facilitate loading of boats, or can have a deck (not shown) for carrying other loads.

OPERATION

FIGS. 1 and 2

To load the trailer, the bed frame 11 is lowered to an inclined position as shown in FIG. 3 with the aft end of the trailer bed supported on the ground. In this position wheeled or tracked vehicles can be driven onto the trailer under their own power. When used for loading a boat from a beach the trailer is backed to the water's edge and the trailer is then lowered to water level so that the boat can be hauled up onto the bed.

The winding drum is then operated to apply tension to the cables so as to draw the forward ends of the leaf springs into the brackets, and the pins 48 and 50 are then inserted through the registering holes and over the springs. The cable is then slackened sufficiently to permit the spring ends to move upward to engage the pins, thus locking the pins in the brackets.

To lower the trailer bed to an unloading position, the cable is tensioned to take the weight off the pins so to permit their withdrawal from the brackets. The trailer bed frame can then descend to its loading position.

To disassemble the trailer to facilitate storage, the cable 51 is disconnected from the springs, and the arms are then rotated upwards, see FIG. 3, beyond the upwardly sloped position 21.2 to a broken outline position 21.3 so that the flanges 39 and 39.1 clear the flanges 42 and 42.1. The stub shafts are then withdrawn from the sockets.

FIG. 6, Alternative Embodiment

FIG. 6 illustrates an alternative embodiment of a trailer, generally 70.

The trailer 70 has a bed frame 71 constructed substantially as described with reference to the trailer 10, the bed frame having side members 72 and 72.1 and transverse members severally 73 and 73.1, 73.2. Tubes 74 and 74.1 which serve as sockets for stub shafts 75 and 75.1, project laterally from supporting arms 77 and 77.1 are connected to the side frame members 72 and 72.1 and to the transverse member 73 of the bed frame. Axes 78 and 78.1 of the tubes lie in a plane parallel to the bed frame and each is disposed so as to extend outward and forward at angle $\phi$, of approximately 60°, to a fore and aft axis 79 of the trailer. The stub shafts 75 and 75.1 extend at an angle $\phi$ from the arms 77 and 77.1 so that upon swinging the supporting arms from substantially horizontal positions parallel to the side frame members to upwardly sloped positions the arms also swing outwards to broken outline positions 77.2.

Operation of the trailer 70 is the same as operation of the trailer 10. The trailer 70 can be used for transporting a relatively wide load, such as a wide boat, as outward movement of the supporting arms when the trailer bed frame is lowered provides clearance from sides of the boat.

I claim:
1. A tilting bed trailer including:
   a. a bed frame (11) having parallel side frame members (12, 12.1) on a common plane,
   b. a pair of members having sockets (18, 18.1) opening outward of opposite sides of the trailer bed frame,
   c. a pair of supporting arms (21, 21.1) disposed on opposite sides of, and parallel to, the side frame members of the bed frame,
   d. ground engaged wheels (37, 37.1) mounted at forward ends of the supporting arms,
   e. stub shafts (25, 25.1) projecting from aft ends of the supporting arms, the shafts having a rotatable and slidable fit in the sockets,
   f. leaf springs (27, 27.1) connected to and extending forward of forward ends of the supporting arms, each spring having a forward and an aft end,
   g. means (51, 55) connected to forward ends of the springs for rotating the supporting arms so as to move the bed frame between elevated and lowered positions,
   h. flanges (42. 42.1) connected to the side frame members aft of the supporting arms,
   i. flanges (39, 39.1) at aft ends of the supporting arms, having a sliding fit between the side frame members and the first mentioned flanges for preventing withdrawal of the shafts from the sockets when the supporting arms are moved.

2. A trailer as claimed in claim 1 including flanges (43, 43.1) at forward ends of the supporting arms and flanges (44, 44.1) connected to the side frame members of the trailer bed frame, the flanges on the arms having a sliding fit between the frame flanges and the side frame members when the arms are disposed parallel to the side frame members.

3. A trailer as claimed in claim 1 including brackets (45, 45.1) having side walls, the brackets being mounted on each side frame member and adapted for receiving forward ends of the springs when the arms are disposed parallel to the side frame members and pins (48, 50) extendable through holes in the side walls of the brackets and over the springs, each pin having an annular groove (49) in which a wall of each bracket engages for releasably locking the pins against movement relative to the brackets.

4. A trailer as claimed in claim 1 in which the socket members extend in a plane parallel to the plane of the trailer bed frame and extend at an acute forward angle to a fore and aft axis of the trailer so that forward ends of the arms swing upwards and outwards away from the side frame members of the trailer bed frame when the bed frame is lowered to a loading position.

5. A trailer as claimed in claim 1 wherein the means for moving the supporting arms includes a first cable (51) extending beneath the trailer bed frame and connected at opposite ends to the forward ends of the springs, a second cable (55) connected at a mid-point of the first cable, a winding drum (59) mounted for rotation on the trailer bed frame on which the second cable is wound so that tension can be applied to the cables to swing the arms downward from upwardly sloped positions so as to lift the bed frame to an elevated position.

6. A trailer as claimed in claim 1 in which the flanges at aft ends of the supporting arms are movable into a position clear of the flanges of the trailer bed when the supporting arms are swung upwards beyond a position assumed by said supporting arms when the trailer is lowered to the loading position so as to enable the stub shafts to be withdrawn from the sockets.

* * * * *